(12) United States Patent
Franke et al.

(10) Patent No.: US 9,178,303 B2
(45) Date of Patent: Nov. 3, 2015

(54) ELECTRICAL CABLE CONNECTOR

(75) Inventors: Jens Franke, Bad Pyrmont (DE); Thomas Fuehrer, Blomberg (DE); Ralf Feldner, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 71 days.

(21) Appl. No.: 14/114,935

(22) PCT Filed: May 3, 2012

(86) PCT No.: PCT/EP2012/001919
§ 371 (c)(1),
(2), (4) Date: Oct. 31, 2013

(87) PCT Pub. No.: WO2012/150038
PCT Pub. Date: Nov. 8, 2012

(65) Prior Publication Data
US 2014/0065873 A1 Mar. 6, 2014

(30) Foreign Application Priority Data

May 4, 2011 (DE) .......................... 10 2011 100 499

(51) Int. Cl.
*H01R 13/59* (2006.01)
*H02G 15/007* (2006.01)
*H02G 15/117* (2006.01)
*H02G 15/18* (2006.01)

(52) U.S. Cl.
CPC ............. *H01R 13/59* (2013.01); *H02G 15/007* (2013.01); *H02G 15/117* (2013.01); *H02G 15/18* (2013.01)

(58) Field of Classification Search
USPC .......... 439/462, 283, 578, 583, 584, 275, 709
See application file for complete search history.

(56) References Cited

U.S. PATENT DOCUMENTS

| | | | | |
|---|---|---|---|---|
| 3,054,847 | A * | 9/1962 | Colbert | 174/88 R |
| 3,764,959 | A * | 10/1973 | Toma et al. | 439/584 |
| 3,789,346 | A * | 1/1974 | De Brick | 439/283 |
| 4,388,523 | A * | 6/1983 | Keep et al. | 219/541 |
| 5,308,122 | A * | 5/1994 | Crawford et al. | 285/52 |
| 5,927,892 | A * | 7/1999 | Teh-Tsung | 403/259 |
| 7,399,208 | B2 * | 7/2008 | Schmidt | 439/578 |
| 7,781,685 | B2 * | 8/2010 | Bartholoma et al. | 174/654 |
| 7,878,868 | B2 * | 2/2011 | Mech et al. | 439/709 |
| 7,973,240 | B2 * | 7/2011 | Corren et al. | 174/84 R |
| 8,398,419 | B2 * | 3/2013 | Coyle, Jr. | 439/275 |
| 8,690,599 | B2 * | 4/2014 | Bartholoma et al. | 439/462 |
| 8,919,221 | B2 * | 12/2014 | Chiou | 74/502.4 |

OTHER PUBLICATIONS

DIN 60529, Schutzarten durch Gehäuse (IP-Code), Sep. 2000, Beuth Verlag GmbH, Berlin.
DIN 40050, IP-Schutzarten, May 1993, Beuth Verlag GmbH, Berlin.

* cited by examiner

*Primary Examiner* — Alexander Gilman
(74) *Attorney, Agent, or Firm* — Leydig, Voit & Mayer, Ltd.

(57) ABSTRACT

A cable connector includes a housing, a first screwed cable gland for receiving a first cable, and a second screwed cable gland for receiving a second cable. The first cable can be connected to the second cable using a contact device. The cable connector also includes a locking device which, when screwing at least one screwed cable gland to the housing, locks said screwed cable gland to the housing so that the cables are mounted on the housing in a protected manner.

17 Claims, 3 Drawing Sheets

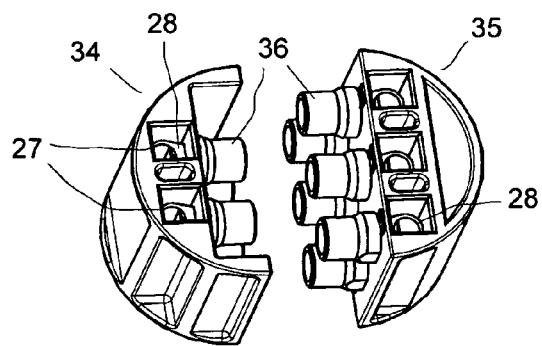
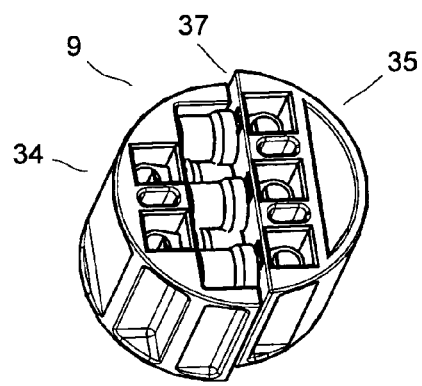
Fig. 4    Fig. 5
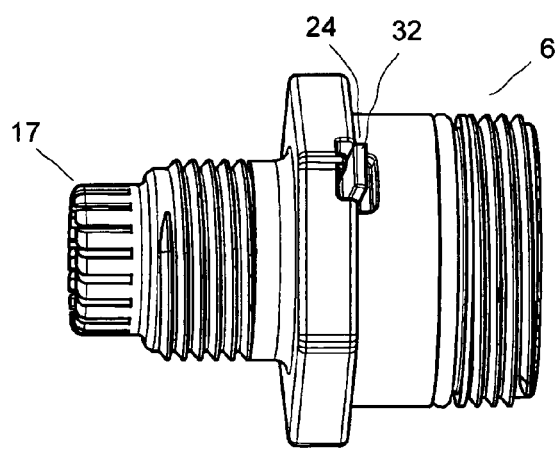
Fig. 6
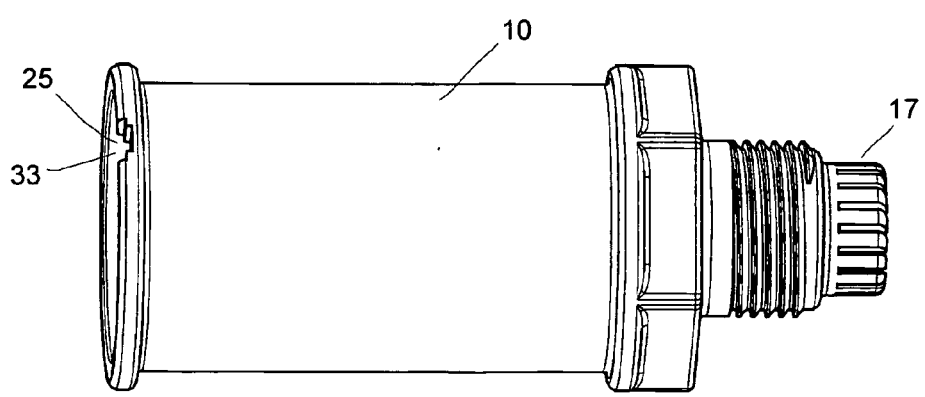
Fig. 7

ELECTRICAL CABLE CONNECTOR

CROSS-REFERENCE TO RELATED APPLICATIONS

This application is a U.S. National Stage application under 35 U.S.C. §371 of International Application No. PCT/EP2012/001919, filed on May 3, 2012, and claims benefit to German Patent Application No. DE 10 2011 100 499.1, filed on May 4, 2011. The International Application was published in German on Nov. 8, 2012, as WO 2012/150038 A2 under PCT Article 21(2).

FIELD

The present invention relates to a cable connector for at least two electrical cables. In principle, the invention can be used to connect as many cables as desired. A particularly preferred area of application is the connection of solar cables, which are used for line transmission and/or to transfer signals to photovoltaic systems. When assembling photovoltaic systems the cables must frequently be laid flexibly. It can occur in the process that cables have to be extended or shortened in order to be laid optimally on the roof of a building, for example.

BACKGROUND

Cable connectors, which are used in the field of photovoltaic systems, are often exposed to difficult environmental conditions, since they are often laid more or less unprotected in the open air. Therefore cable connectors must meet higher protection requirements in order to safeguard the protection of people against potential danger when using them and to protect the system itself. Usually at least protection class IP67 pursuant to DIN EN 60529 and DIN 40050 Part 9 is required for such cable connectors outside. That means there is protection against access with a wire and a dustproof seal of the cable connector. Furthermore, there is at least protection against temporary submersion in water. Such operating conditions may occur, for example, when it is raining or snowing.

Another important characteristic of such cable connectors is the provision of reliable protection against accidental contact. Since photovoltaic systems are often installed on the roofs of privately-owned residential buildings, it is also necessary to provide protection against accidental contact such that the private individuals cannot inadvertently come into contact with the live parts.

SUMMARY

In an embodiment, the invention provides a cable connector including: a housing; a first screwed cable gland configured to receive a first cable; a second screwed cable gland configured to receive a second cable; a contact device configured to connect at least the first cable to the second cable; and a locking device configured to lock, upon a screwing of at least one of the first screwed cable gland and the second screwed cable gland to the housing, the at least one of the first screwed cable gland and the second screwed cable gland to the housing so that the first cable and the second cable are mounted on the housing in a protected manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 is a view of the contact device of the cable connector according to FIG. 1;

FIG. 5 is another view of the contact device of the cable connector according to FIG. 1;

FIG. 6 is a view of a screwed cable gland of the cable connector according to FIG. 1; and FIG. 7 is a view of the tubular member of the cable connector according to FIG. 1.

DETAILED DESCRIPTION

Figure 1:
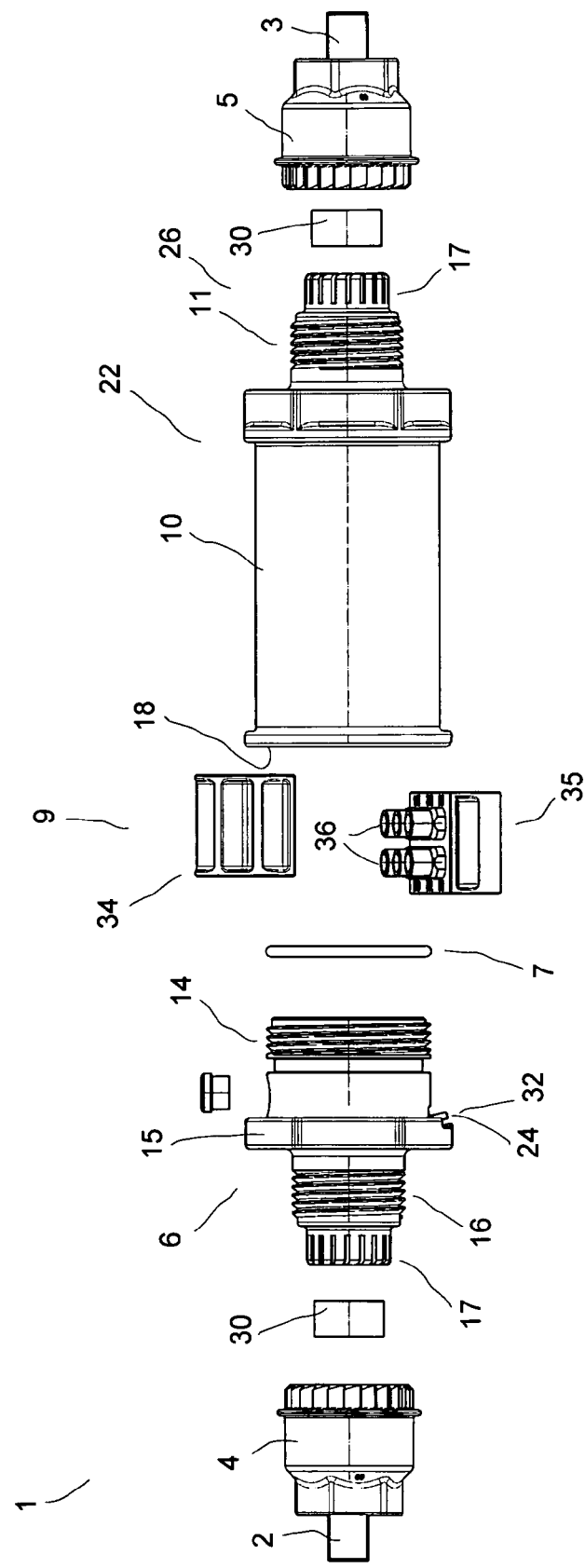
FIG. 1 is a schematic, exploded view of a cable connector according to the invention.

An aspect of the present invention provides a cable connector, which tightly connects two cable ends to each other, the cable ends being protected from contact with the hand of even an inexperienced user.

The cable connector according to the invention is provided with a housing. The cable connector according to the invention comprises a first screwed cable gland for receiving a first cable and at least a second screwed cable gland for receiving a second cable. At least one contact device is provided, where at least the first cable can be connected to at least the second cable. In addition, at least one locking device is provided which, when screwing at least one screwed cable gland to the housing, locks said screwed cable gland to the housing. The cables are mounted on the housing in a protected manner.

The first screwed cable gland can be screwed to the housing or the second screwed cable gland can be screwed to the housing or the first screwed cable gland and the second screwed cable gland can be screwed to the housing.

The cable connector according to the invention has many advantages since it has a simple design and provides reliable protection from environmental factors and is constructed such that it is protected against accidental contact. Increased protection is ensured by the locking device since when screwing the corresponding screwed cable gland to the housing a locked state occurs, which cannot be released again by hand.

In particular, the locking device can be constructed such that non-destructive opening is not possible subsequent to locking. A particularly high level of protection is thus achieved since, if an inexperienced person takes hold of the cable connector, he cannot open the cable connector to the extent that he comes into contact with the cable ends.

In particular, however, non-destructive opening with the aid of a tool is also possible. It is possible and preferred that the locked state can be released with a tool. In such a configuration, the housing of the cable connector can also be reopened after locking in order to inspect the contacting of the cables, for example.

The housing preferably comprises at least one tubular member, in which the contact device can be received in a protected manner. This means in particular that the tubular member receives the contact device entirely. If, for example, the tubular member is a cylindrical shape then the tubular member protects against touching the contact device along the whole circumference of the cylinder, so that only the front ends of the tubular member that might be open have still to be protected.

In particular, the tubular member consists of a non-conductive material which is plastic, for example. The tubular member can not only be cylindrical but can also have, for example, a rectangular external cross section. Other polygonal cross sections or elliptical cross sections or similar are also possible.

The contact device is preferably received non-rotatably on the housing and in particular on the tubular member. In particular, the internal cross section of the tubular member is designed in such a way that the contact device can be received non-rotatably on the inside of the tubular member. It is possible, for example, that for assembly, the tubular member is pushed over a cable end and then the cable ends are connected to each other by means of the contact device and that the tubular member is then pushed over the contact device until it receives the contact device inside it.

Such a configuration with a tubular member, which receives the contact device in a protected manner, has considerable advantages. In particular, the construction of a compact cable connector is also facilitated, which requires relatively little space. The installation of a cable connector is thus facilitated even in thin profiles or in narrow grooves, which are to be found on roofs or on façades, for example. Large-scale cable connectors from prior art often cannot be used there since the space available does not always suffice. The cable connector according to the invention affords considerable advantages here since it is constructed flexibly to meet demands.

The contact device can preferably be received tightly in the axial direction in a central region of the housing. A central region is understood to mean in particular a region, the axial distances of which to the screwed cable gland only differ by a range of +/−20% and preferably of +/−10%.

The tubular member is preferably provided with the first or the second screwed cable gland. This means in particular that the tubular member is connected tightly to the first or the second screwed cable gland. It is possible for the tubular member and one screwed cable gland to be constructed as one piece.

Advantageously, the contact device has at least one contact carrier or is constructed as such. It is particularly preferable for the contact device to comprise contact carriers that may be separated from each other and, in particular, to comprise a first contact carrier and a second contact carrier. Each contact carrier can have a plurality of contacts so that the contact device is suitable for connecting multi-core cables. For example, cables having three, four, five or more conductors can be connected to each other.

The locking device preferably has at least one locking unit and in particular at least one locking latch on the screwed cable gland. At least one locking unit, and in particular a locking contour, interacting with it is provided on the housing. The interacting locking units on the screwed cable gland and on the housing facilitate simple assembly where an independent release without the use of a tool is no longer possible after the locking units of the locking device are locked. In order to release the connection and to open the cable connector, the locking device must be released again which, in certain configurations, is only possible through a reversible deformation or damage or even destruction of one of the locking units. Reliable protection from unintentional opening is thus ensured since, without the use of a tool, such a force would initially have to be exerted that would deform, damage or even destroy a locking unit.

It is particularly preferable for at least one locking latch to be constructed such that it is elastically deformable in the axial direction while it is considerably more rigid in the circumferential direction.

The locking latch is constructed so as to be thin in the axial direction in particular, while it has a multiple wall thickness in the circumferential direction. Elasticity is thus achieved in the axial direction while the locking latch is constructed so as to be rigid in the circumferential direction. The locking latch preferably interacts with a locking contour. The locking contour can be constructed as a locking groove, recess, indentation or similar. It is possible for the locking latch to be provided on a screwed cable gland and for the locking contour to be provided on the housing and in particular on the tubular member. However, it is also possible for the locking latch to be provided on the tubular member while the locking contour is arranged on the screwed cable gland. If the locking latch is arranged on the screwed cable gland, it is preferably arranged protruding radially outwards. In the locked state it engages in the locking contour on the housing. It is thus possible for the locking latch to practically not protrude beyond the housing in a radially outward direction, which protects against an unintentional release of or unintentional damage to the locking device.

If the locking latch is arranged on the housing, it preferably protrudes radially inwards so that also in this case preferably no parts protrude outwards.

A radially outwards protruding locking latch on the screwed cable gland is elastically deformed in the axial direction while the screwed cable gland is screwed on when the locking latch reaches the housing. When the locking latch reaches the angled point of the locking contour, the locking latch engages in the locking contour whereby the elastic deformation is reversed. There is subsequently a tight connection, which can be reversed if the locking latch is pushed away elastically until the locking latch has left the locking contour.

A plurality of symmetrically arranged locking devices can be provided in all of the embodiments.

It is possible for at least one locking unit to be constructed as star-shaped toothing. The interacting locking unit then preferably has locking teeth or similar, which interact with the star-shaped toothing.

In preferred developments of all the embodiments, the contact carrier has at least one contact, which is taken from a group of contacts comprising screwed contacts, clamp contacts, plug contacts, solder contacts and other similar contacts.

In a specific configuration, at least one contact is executed as a screwed contact. It is also possible for the contacts to be executed as clamp contacts or for the individual conductors of the cables to be connected to be soldered to each other.

It is also possible for a screwed cable gland to be screwed onto both sides of the tubular member, which accordingly locks with the housing.

In all configurations, the cable can comprise two, three, four, five or more and in particular also six, eight, ten or twelve or another number of conductors. In all configurations, the screwed cable glands preferably have threads on the sides turned away from each other in order to be screwed there with corresponding nuts. When the nut is screwed onto the corresponding screwed cable gland, the cable is received at the screwed cable gland in clamped manner. A seal, which consists in particular of an elastic material or similar, is preferably provided to seal the interior of the screwed cable gland.

For assembly, a nut and the corresponding screwed cable gland or tubular member with associated screwed cable gland are pushed onto a cable end and the two cable ends are connected to each other by means of the contact device. Then one screwed cable gland is pushed onto the contact device from one side and the other screwed cable gland from the other side with the tubular member if applicable so that the contact device is received non-rotatably inside the tubular member. Then the screwed cable gland or glands is/are screwed to the tubular member. In this state the contact device is already mounted on the housing in a protected manner. Since the screwed cable gland is engaged on the housing, it is not possible to open the housing readily. In particular, it is practically impossible to reopen the housing by hand without a tool so a very reliable protection is provided even for inexperienced persons against touching the conductor or core ends.

Following the screwing of the screwed cable gland to the tubular member, the nuts on the ends of the screwed cable glands are screwed on the screwed cable glands so that the cable ends are received on the screwed cable glands in a clamped and sealed manner The contact device preferably has a first contact carrier and at least a second contact carrier. The two contact carriers can be connected to each other so that they are tightly connected to each other in the axial direction. Such a configuration is particularly advantageous since it becomes possible to connect a first quantity of conductors to one contact carrier whilst a second quantity of conductors are connected to the second contact carrier. Such a configuration makes assembly considerably easier, since it is very difficult to connect all the conductors to a single contact element when connecting four, five or more conductors, for example. The length of the individual conductors must be adjusted accurately when connecting them to a single part and they must accordingly be accurately stripped of their insulation. Apart from this it is often difficult to bring the conductors into a suitable form in order to ensure a secure connection, for example to a screwed contact connection. If, in contrast, the contact device is divided into a first contact carrier and at least a second contract carrier, which can be separated from each other, this makes the connection of a plurality of conductors considerably easier. If, for example, five conductors are connected to each other then two conductors can be connected to a first contact carrier while three conductors have to be connected to the second contact carrier. This is simple to accomplish, however.

After the conductors have been connected to the first contact carrier and to the second contact carrier, the two contact carriers are connected to each other by means of a plug connection, for example. The contact device is thus connected as a whole in the axial direction so that it is easily possible to fix the contact device inside the housing in the axial direction.

It is particularly preferable for the first contact carrier and the second contact carrier to be plugged into each other axially offset in relation to each other. If the contact carriers have screwed cable glands, which are provided with screw bosses, for example, then it is preferable for the first contact carrier and the second contact carrier to be plugged into each other with the screw bosses, a screw boss of one contact carrier being inserted between a plurality of screw bosses of the other contact carrier. In addition, a very compact and space-saving structure of the contact device and the whole cable connector is thus facilitated even if conductors having a large cross section are used to transmit large currents.

In order to prevent condensation from atmospheric humidity inside the housing and at least avoid it for the most part, at least one membrane is preferably provided, which facilitates the equalisation of pressure inside the housing in relation to its surroundings. Such a configuration is very advantageous since without pressure equalisation it can happen that damp ambient air can be sucked into the interior of the housing if there is low pressure inside the housing, which may occur, for example, during rapid cooling as a result of rain or similar. If the temperature falls for example at night the air that has been sucked into the housing can reach dew point so that water condenses inside the housing. Condensation water inside the housing can lead to a contact bypass or contact difficulties and must be avoided.

The use of a membrane facilitates the equalisation of pressure, thus preventing damp air from being sucked in from the surroundings.

The membrane can be constructed such that it is elastic and can, for example, abut an equalisation chamber. In such a configuration the air exchange with the surroundings is almost completely ruled out. The equalisation of volume in the event of fluctuations in air pressure or temperature occurs as a result of the elastic membrane and a corresponding change in volume in the equalisation chamber. Such a configuration functions reliably.

It is, however, also particularly preferable for the membrane to be semi-permeable. In particular the membrane is constructed such that it is permeable to air but not water. Pressure equalisation is thus possible, whilst simultaneously the ingress of water is prevented.

In a particularly preferred development, two cores or conductors are connected to the first contact carrier whilst three cores or conductors are connected to the second contact carrier.

Another cable connector according to the invention has a housing, a first screwed cable gland to receive a first cable and a second screwed cable gland to receive a second cable. At least one contact device is provided, by means of which at least the first cable can be connected to the second cable. The contact device comprises a first contact carrier and at least a separate second contact carrier to which at least one conductor of the first cable and one conductor of the second cable can be connected, respectively, in order to connect the cables accordingly. The first and the second contact carriers can be connected to each other mechanically.

This cable connector according to the invention also has many advantages, since it facilitates a flexible and simple connection of two cables. As a result of the contact device comprising a first and a second contact carrier, cables with a plurality of conductors can also be assembled simply and securely. In the process, a first quantity of conductors is connected to the first contact carrier whilst the second quantity of conductors of a cable is connected to the second contact carrier. Because of the division into two or more contact carriers, the installer can connect the cables to each other considerably more easily. Particularly in the case of rigid conductors having large conductor cross sections, this makes assembly considerably easier. As a result of the mechanical connection of the first contact carrier and the second contact carrier, the contact device can easily be defined mechanically overall.

The contact device preferably has at least one round cross section. The round cross section is provided in particular on a connecting plane of the first and of the second contact carrier. The first and the second contact carriers are preferably plugged together axially offset in relation to each other. The first end of the first contact carrier thus protrudes beyond the second contact carrier, whilst the second end of the second contact carrier protrudes beyond the first contact carrier. An easy separation of the two contact carriers from each other can thus be facilitated since the installer can also separate the two contact carriers from each other again without the use of a tool.

In developments, the cable connector comprises the features of configurations as described above.

Overall, the invention provides a cable connector, which connects cables to each other in accordance with protection class IP 67. The cable connector is also suitable for connecting AWG 12-core ("American wire gauge"). Such cables with large cable cross sections usually have a nylon jacket, which makes the cable relatively inflexible. The cable connector according to the invention facilitates simple assembly without the cable having to be stripped very far. Overall, a compact construction is made possible.

The cable connector cannot be reopened without the use of a tool so a high level of reliability and safety is guaranteed.

Negative effects through settlement, which can occur in the case of screwed connections, are prevented by at least one locking device.

Use in the open air is also possible, reliable and safe.

The cable connector according to the invention provides a connection of at least two cables that is easy to assemble, the cable connector consisting in particular of perhaps only four or five simple plastic parts to connect the cable ends of cables that are to be connected to each other. The construction is compact and small and assembly can take place easily and without special tools.

Further advantages and features of the present invention emerge from the description of the embodiment.

Figure 2:
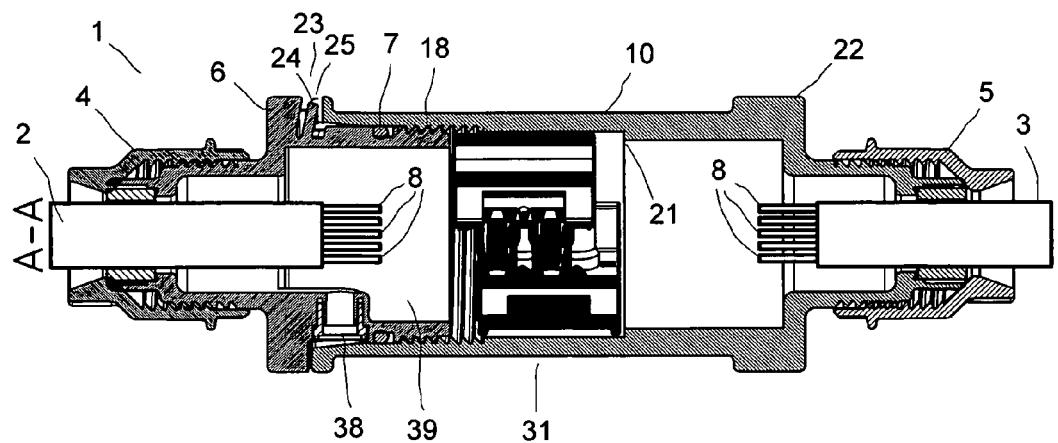
FIG. 2 is a cross section through a cable connector according to FIG. 1.

An embodiment of a cable connector according to the invention is described hereinafter with reference to the accompanying FIGS. 1 to 7, a schematic exploded view of the cable connector 1 being shown in FIG. 1. The cable connector 1 serves to connect two cables 2 and 3, which each comprise a plurality of individual conductors 8 (c.f. FIG. 2).

The electrical contact of the individual conductors 8 is established by means of the contact device 9. For this purpose, the contact device 9 comprises screw contacts 28 as contacts 27 here, the individual conductors 8 being fixed to the contact device 9 in a clamped manner using screws and thus connected to each other electrically.

The whole cable connector 1 consists here of the contact device 9, a tubular member 10 and screwed cable glands 6 and 26, and two nuts 4 and 5, which are screwed at both ends of the cable connector 1 onto the respective screwed cable glands 6 and 26 in order to seal the ends of the cables 2 and 3 in relation to the cable connector and to receive the cables 2 and 3 in clamped manner on the cable connector 1.

On the screwed cable glands 6 and 26 there are sealing blades 17, which are bent laterally when the nuts 4 and 5 are screwed onto the screwed cable glands 6 and 26 and therefore clamp the seals 30, which are provided on the inside of the screwed cable glands 6 and 26, against the cable ends of the cables 2 and 3 in a sealing manner. The seals 30 consisting of a rubber elastic compound deform elastically and clamp the cables 2 and 3 fixed tightly inside the screwed cable glands 6 and 26.

The screwed cable gland 6 comprises an outer thread 14 on the side facing the contact device 9 and an outer thread 16 on the end assigned to the cable 2, onto which the nut 4 is screwed. A key surface 15 is provided on the screwed cable gland 6 in order to be gripped by a tool. A sealing device 7 in the form of an O-ring, for example, seals the screwed cable gland 6, which has been screwed into the tubular member 10, radially outwards so that the inside of the tubular member 10 is protected from the ingress of dust and moisture.

The other screwed cable gland 26 here is tightly connected to the tubular member 10 and can, for example, be produced as one piece with the tubular member 10. An inner thread 18 on the tubular member 10 serves to screw together with the outer thread 14 of the screwed cable gland 6.

On the end turned towards the cable 3 the screwed cable gland 26 has an outer thread 11 onto which the nut 5 is screwed in order to receive the cable 3 on the screwed cable gland 26 via the seal 30 in a clamped manner.

FIG. 2 shows a cross section of the cable connector 1 with the cables 2 and 3 indicated schematically, the individual conductors 8 of which are not, however, shown in their connected state. The cables 2 and 3 each have five conductors 8, of which three are shown in the foreground in FIG. 2. Another two conductors are arranged in a plane behind.

The contact device 9 is received with the contact carriers 34 and 35 inside the tubular member 10. The tubular member 10 is constructed as one piece with the screwed cable gland 26. In the process the contact device 9 is received here preferably non-rotatably inside the tubular member 10.

In FIG. 2 the seals 30 inside the screw connections 6 and 26 can also be seen, and are compressed with the cables 2 and 3 when the nuts 4 and 5 are screwed on in order to facilitate and ensure a dust and watertight feed-through of the cables 2 and 3 at the ends of the cable connector 1.

Figure 3:
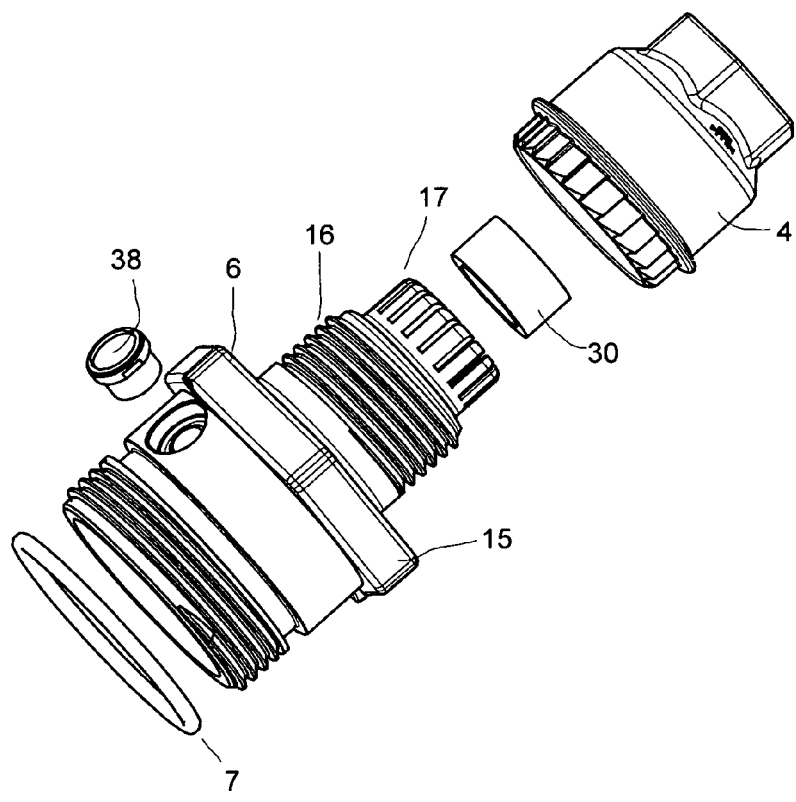
FIG. 3 is a perspective view of a screwed cable gland of the cable connector according to FIG. 1.

FIG. 3 shows an enlarged perspective view of the screwed cable gland 6. The screwed cable gland 6 has sealing blades 17 at the cable ends. The outer thread 16 serves to screw the nut 4. The key surfaces 15 can be gripped with pliers or a spanner or another tool in order to rotate the screwed cable gland 6 in a defined manner. The outer thread 14 serves to screw with the inner thread 18 of the tubular member 10.

The membrane 38 can be seen clearly in FIG. 3 and is inserted into the housing 22 of the cable connector 1 in order to facilitate equalisation of pressure in the event of different weather conditions. The membrane 38 is in particular semipermeable and therefore permeable to air, but not to water. During different weather conditions it can thus be ensured that no moisture can reach the interior 39 of the cable connector 1. Condensation of water on the interior is prevented when the outside temperature cools down.

FIG. 4 shows a perspective view of the first contact carrier 34 and the second contact carrier 35 of the contact device 9, it not being possible to see the individual screws of the contacts 27 in detail since they are arranged inside the screw bosses 36. The contacts 27 here are constructed as screw contacts 28. The contact carrier 34 has two contacts 27 and the contact carrier 35 has three contacts 27 so that in total cables 2 and 3 can each be connected with 5 conductors.

FIG. 5 shows the contact device 9, after the contact carriers 34 and 35 have been connected to each other mechanically. For connection, the screw bosses 36 of one contact carrier 34, 35 are pressed between the screw bosses 36 of the other contact carrier 34, 35 so that there is a tight mechanical fit. Overall the contact device 9 has a round cross section in the overlapping region of the two contact carriers 34, 35 which is adapted to the inner cross section of the tubular member 10. This results in an axial offset 37 of the two contact carriers 34 and 35. If required, the connection of the two contact carriers 34 and 35 can thus easily be released by hand without a tool.

An axial fixing of the contact device 9 results from the offset on the inner contour 21. The contact device 9 is received in clamped manner between the inner contour 21 and the screwed cable gland 6 so that there is a defined fit.

FIG. 6 shows another view of the screwed cable gland 6, a locking unit 24 of the locking device 23 being visible on the outside. The locking unit 24 here is constructed as a locking latch 32, which can be moved elastically in the axial direction.

The locking latch 32 from FIG. 6 interacts with the locking unit 25, which is constructed as a locking contour 33, of the housing 22. The locking contour 33 is shown such that it is clearly recognisable in FIG. 7. The locking contour 33 here is provided on the tubular member 10 of the housing 22 and is constructed as a groove-like recess, or similar.

When the screwed cable gland 6 is screwed to the housing 22 or the tubular member 10, the locking latch 32 then finally comes into axial contact with the tubular member 10 and is bent backwards elastically. When the angled point is reached, on which the locking contour 33 is arranged, the already axially preloaded locking latch 32 snaps into the locking contour 33 so that a stable locking of the housing 22 is achieved. A reopening of the housing 22 is only possible using a tool; that is if the locking latch 32 is moved backwards with a screwdriver, for example, so that it is no longer engaged with the locking contour 33.

For assembly, the jacket of the conductor ends of the cables 2 and 3, which are to be connected, is removed and the insulation of the individual conductors 8 stripped. A cable end is inserted through the nut 5 and through the tubular member 10. The conductors 8 are connected to one side of the contact carriers 34 and 35. Afterwards, the other cable is inserted through the nut 4 and the screwed cable gland 6 and likewise connected to the contact carriers 34 and 35. Then the contact device 9 is pulled into the tubular member 10 by pulling on the cable 3 and is fixed by screwing the nut 5. Next, the screwed cable gland 6 is screwed into the tubular member 10. Finally, the nuts 4 and 5 are screwed onto the screwed cable glands 6 and 26 so that the sealing blades 17 each ensure a tight seal together with the seal 30.

While it is possible to unscrew the nuts 4 and 5 from the ends of the cable connector 1 subsequent to assembly, the contacts on the contact carriers 29 are, however, also not accessible by hand or similar since they are received in a protected manner inside the cable connector 1. Altogether the screwed cable glands 6 and 26 and the tubular member 10 form a housing 22, which reliably encloses the contact carriers 34 and 35. A tool is needed to continue opening the cable connector 1. That means that it is practically impossible to unintentionally open it by hand.

The cable connector 1 ensures a safe and reliable contact of two cables, it being possible to connect five or more conductors 8 to each other. Because two contact carriers 34 and 35 are provided, simple assembly is facilitated even when there is a plurality of conductors 8. Condensing moisture in the interior of the housing 22 is prevented by the membrane 38. Unintentional opening of the housing 22 is prevented by the locking with the locking device 23.

Overall, the cable connector 1 comprises only a few different plastic parts thus facilitating simple and cost-effective production. The assembly is simple and reliable and provides a high level of protection from unintentional contact by touch due to the locking of the components. The whole construction is compact and can be installed flexibly even in narrow spaces. No special tool is necessary when handling it, which is often not the case in the assembly of photovoltaic systems on roofs and similar.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS cable connector 1
cable 2
cable 3
nut 4
nut 5
screwed cable gland 6
sealing device, O-ring 7
conductor 8
contact device 9
tubular member 10
thread 11
outer thread 14
key surface 15
outer thread 16
sealing blades 17
inner thread 18
inner contour 21
housing 22
locking device 23
locking unit 24
locking unit 25
screwed cable gland 26
contact 27
screwed contact 28
seal 30
central region 31
locking latch 32
locking contour 33
first contact carrier 34
second contact carrier 35
screw boss 36
offset 37
membrane 38
interior 39

The invention claimed is:
1. A cable connector, comprising;
a housing;
a first screwed cable gland configured to receive a first cable;
a second screwed cable gland configured to receive a second cable;

a contact device configured to connect at least the first cable to the second cable;

a locking device configured to lock, upon a screwing of at least one of the first screwed cable gland and the second screwed cable gland to the housing, the at least one of the first screwed cable gland and the second screwed cable gland to the housing so that the first cable and the second cable are mounted on the housing in a protected manner; and a membrane configured to facilitate an equalization pressure of an interior of the housing in relation to its surroundings.

2. The cable connector of claim 1, wherein the housing includes a tubular member configured to receive the contact device in a protected manner.

3. The cable connector of claim 1, wherein the contact device is fixable axially in a central region of the housing.

4. The cable connector of claim 2, wherein the tubular member is provided with the first or second screwed cable gland.

5. The cable connector of claim 1, wherein the locking device includes a locking latch on the at least one of the first screwed cable gland and the second screwed cable gland; and an interacting locking contour on the housing.

6. The cable connector of claim 5, wherein the locking latch is elastically deformable.

7. The cable connector of claim 1, wherein the contact device includes a contact selected from the group consisting of screwed contacts, clamp contacts, solder contacts, and plug contacts.

8. The cable connector of claim 1, wherein the contact device includes a first contact carrier; and a second contact carrier, wherein the first and second contact carrier can be fixed tightly to each other in an axial direction.

9. The cable connector of claim 8, wherein the first contact carrier and the second contact carrier are plugged together, axially offset in relation to each other.

10. The cable connector of claim 1, wherein the membrane is elastic and abuts an equalization chamber.

11. The cable connector of claim 1, wherein the membrane is semi-permeable.

12. The cable connector of claim 1, wherein the membrane is permeable to air but not water.

13. The cable connector of claim 1, wherein at least one of the first cable and the second cable includes at least two conductors.

14. A cable connector, comprising:

a housing;

a first screwed cable gland configured to receive a first cable;

a second screwed cable gland configured to receive a second cable;

a contact device configured to connect at least the first cable to the second cable, wherein the contact device includes a first contact carrier and a separate second contact carrier, wherein the first contact carrier and the second contact carrier are each configured to receive at least one conductor of the first cable and at least one conductor of the second cable, and wherein the first contact carrier and the second contact carrier are configured to mechanically connect to each other.

15. The cable connector of claim 14, wherein the first contact carrier and the second contact carrier each include at least two cable connections including a screw clamp.

16. The cable connector of claim 14, wherein the contact device includes a round cross section, and wherein the first and the second contact carriers are plugged together axially offset in relation to each other.

17. The cable connector of claim 1, wherein at least one of the first cable and the second cable includes at least three conductors.

* * * * *